C. H. SCHOLLE.
Coffee Pot.
No. 91,170.
Patented June 8, 1869.
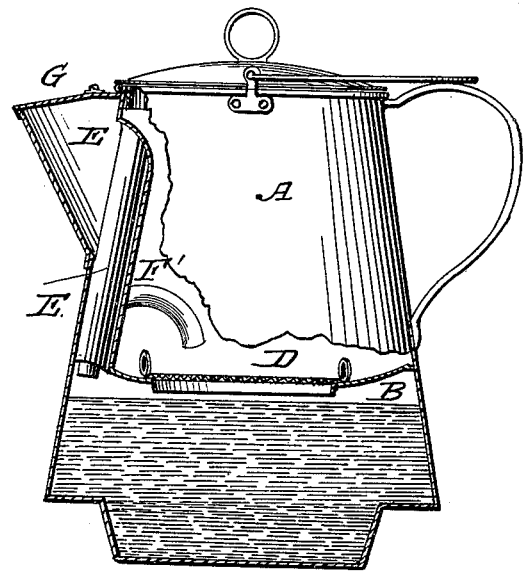
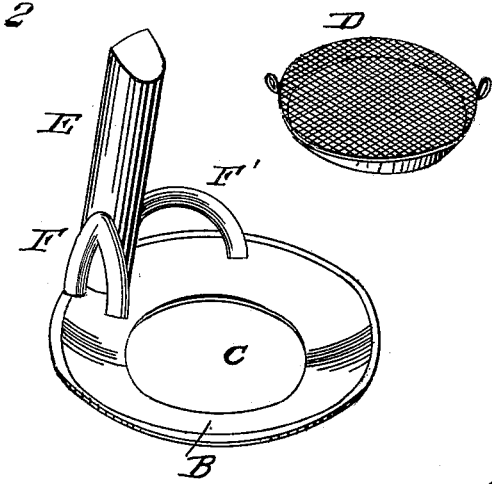

United States Patent Office.

CHARLES H. SCHOLLE, OF CINCINNATI, OHIO.

*Letters Patent No. 91,170, dated June 8, 1869.*

COFFEE-BOILER.

The Schedule referred to in these Letters Patent and making part of the same.

*To whom it may concern:*

Be it known that I, CHARLES H. SCHOLLE, of Cincinnati, Hamilton county, Ohio, have invented a new and useful Coffee-Boiler, of which the following is a full, clear, and exact description, reference being had to the accompanying drawings, making part of this specification.

This is an improvement in the class of coffee-pots which operates by the injection of boiling water from the lower part, upon the ground coffee contained in a percolator in the upper part, whence the decoction descends to the lower part, in condition for use.

Figure 1 is a vertical section through a coffee-pot provided with my improvement.

Figure 2 is a perspective view of the operative parts detached.

A is the pot or enclosing-vessel, having a false bottom or annular diaphragm, B, whose aperture C is closed by a removable sieve or percolator, D.

Extending upward from the lower part of the pot, through the annular diaphragm, to near the top of the pot, is a discharging-spout E.

Also, extending upward through said diaphragm, are two injecting-spouts, F F', which curve over in the manner represented, so as to discharge on to the ground coffee upon the percolator, and to extract its essential properties in a very effectual manner.

A cover, G, over the discharging-end of the spout E, preserves the aroma until wanted. The removability of the percolator permits the hand of the cook to be inserted for cleansing the lower portion.

I claim herein as new, and of my invention—

The arrangement of pot A, annular diaphragm, B, removable percolator D, covered discharging-spout E G, and curved injectors F F', for the purpose set forth.

In testimony of which invention, I hereunto set my hand.

CHAS. H. SCHOLLE.

Witnesses:
 GEO. H. KNIGHT,
 JAMES H. LAYMAN.